March 20, 1962

C. W. GEER 3,026,439

SOLAR ENERGY CONVERTERS

Filed Aug. 3, 1959

INVENTOR.
C. WILLARD GEER

BY

ATTORNEY.

United States Patent Office 3,026,439
Patented Mar. 20, 1962

3,026,439
SOLAR ENERGY CONVERTERS
Charles Willard Geer, Los Angeles, Calif., assignor to Hoffman Electronics Corporation, a corporation of California
Filed Aug. 3, 1959, Ser. No. 831,320
8 Claims. (Cl. 313—100)

The present invention relates to solar energy converters, and more particularly to thermionic solar energy converters.

It has long been one of man's goals to devise a practical and efficient way to convert the energy of the sun into electricity. Many ways of converting solar energy directly into electricity are well known in the art, photovoltaic cells and thermionic solar converters, or heat engines, being among the most popular. One of the difficulties with thermionic solar converters is that in operation they develop a space charge that reduces the efficiency of the converter.

It is an object of the present invention, therefore, to provide a novel thermionic solar converter.

It is another object of the present invention to provide a thermionic solar converter that neutralizes any space charge that develops between the electrodes.

According to the present invention, a thermionic solar converter contains a gas between its cathode and anode and utilizes ultraviolet light from the sun to ionize the gas, thereby reducing any space charge that develops between the cathode and anode and increasing the efficiency of the converter.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1:
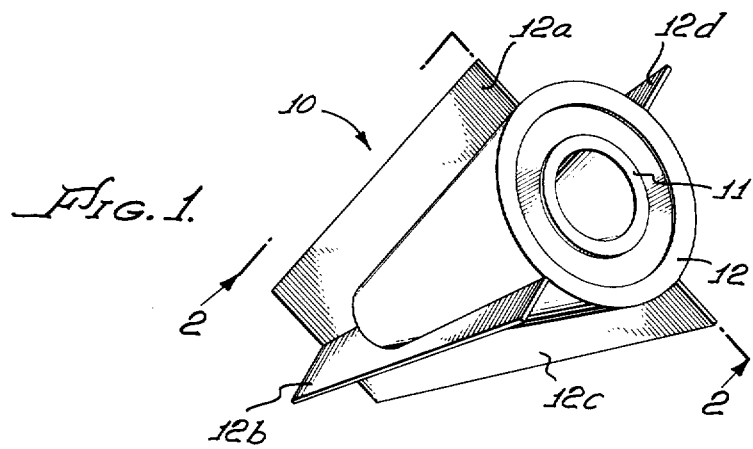
FIGURE 1 is an isometric view of a solar energy converter according to the present invention.

Referring now to the drawings, FIGURE 1 shows solar energy converter 10 having cathode 11 and anode 12. On anode 12 are mounted radiating fins 12a, 12b, 12c, and 12d to aid in the dissipation of heat. Solar energy converter 10 will now be described in greater detail by referring to FIGURE 2.

Figure 2:
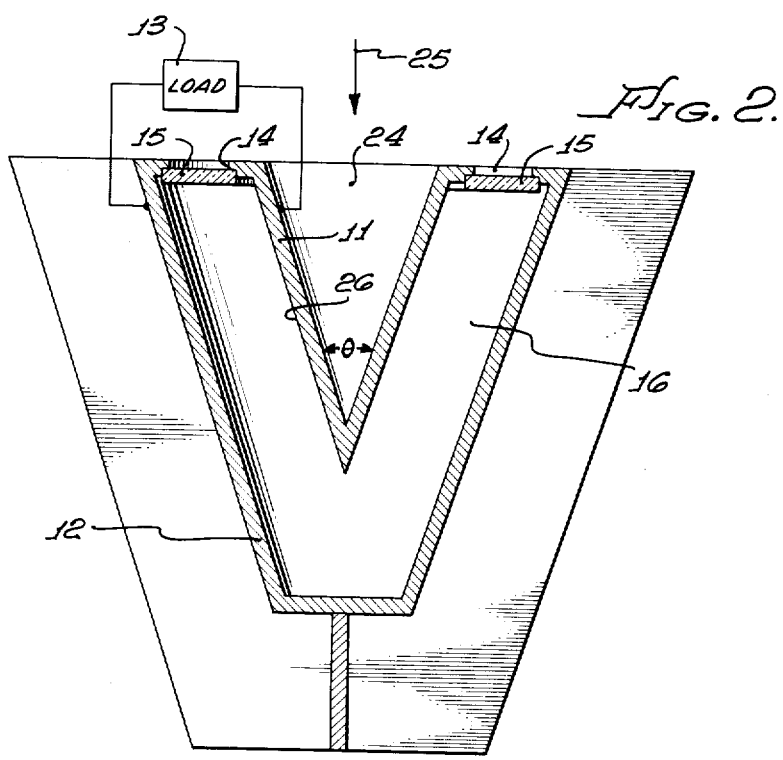
FIGURE 2 is a sectional view taken along line 2—2 of FIGURE 1.

FIGURE 2 shows how cathode 11 is surrounded by anode 12. Both cathode 11 and anode 12 are conical in shape, with cathode 11 being located inside anode 12, and they are electrically coupled together by load 13. Cathode 11 and anode 12 can be of any metal having a high melting point, such as tungsten. It is to be understood that the word "tungsten," when used in conjunction with cathode 11, means tungsten to which an electron emissive susbtance such as thorium has been added. Opening 14, between cathode 11 and anode 12, is sealed by ring 15, which can be of quartz or sapphire or any material that is transparent to ultraviolet light. Chamber 16, formed between cathode 11 and anode 12, is filled with a gas such as nitrogen. Ring 15 prevents the gas from escaping. The angle θ located at the vertex of cathode 11 is small so that sunlight entering cathode 11 through base opening 24 is admitted without being radiated. The angle θ enables cathode 11 to act as a black body. The operation of the solar energy converter shown in FIGURE 2 will now be described.

Sunlight, represented by arrow 25, should be focused through opening 24 by a mirror so that the number of "suns" will raise the temperature of cathode 11 to about 1200 to 1800° C. When cathode 11 becomes sufficiently hot, surface 26 emits electrons which are collected by anode 12. The electrons are emitted from cathode 11 with high kinetic energy, a potential difference is established between cathode 11 and anode 12, and a current is caused to pass through load 13. Normally, under such conditions, a space charge would soon develop between cathode 11 and anode 12 and the current would be decreased. The converter shown in FIGURE 2 is so designed, however, that ring 15 allows the ultraviolet light that is present in the sunlight to shine into chamber 16, thereby ionizing the nitrogen gas in chamber 16. The energy of the ultraviolet light is sufficient to eject electrons from the nitrogen atoms, leaving slow-moving positive ions and thereby greatly reducing the space charge present in chamber 16. The reduction in space charge is particularly effective if the ultraviolet light is permitted to shine upon surface 26 of cathode 11.

A solar energy converter is thus obtained that is capable of neutralizing any space charge that develops between its electrodes.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A thermionic solar energy converter comprising: a conical anode; a conical cathode located within said anode and having an opening in its base so that when said base is oriented towards the sun, sunlight can impinge upon said cathode, said anode and cathode being spaced so as to form a chamber therebetween; a gas in said chamber, said gas being capable of ionizing into positive charges when exposed to ultraviolet light; and a means for preventing said gas from escaping from said chamber, said means allowing ultraviolet light from said sun to enter said chamber and ionize said gas, thereby reducing any space charge that develops between said cathode and anode.

2. Apparatus as defined in claim 1 in which said conical cathode is shaped so as to act as a black body.

3. Apparatus as defined in claim 2 including, in addition, at least one radiating fin connected to said anode to aid in the dissipation of heat.

4. Apparatus as defined in claim 3 in which said ultraviolet light falls upon said cathode in said chamber.

5. Apparatus as defined in claim 4 in which said means is made of quartz and said gas is nitrogen.

6. A thermionic solar energy converter comprising: a conical anode; a conical cathode located within said anode and spaced therefrom so as to form a chamber therebetween; a gas in said chamber, said gas being capable of ionizing into positive charges when exposed to ultraviolet light; and a means for preventing said gas from escaping from said chamber while allowing ultraviolet light to enter said chamber.

7. A thermionic solar energy converter comprising: an anode; a cathode having first and second distinct surfaces, said first surface being adapted for exposure to incident solar energy, and said second surface being spaced from said anode so as to form a chamber therebetween; a gas in said chamber, said gas being capable of ionizing into positive charges when exposed to ultraviolet light; and a means for preventing said gas from escaping from said chamber while allowing ultraviolet light to enter said chamber.

8. Apparatus as defined in claim 7 in which said first and second surfaces are on opposite sides of said cathode.

References Cited in the file of this patent

UNITED STATES PATENTS

| 375,242 | Acheson | Dec. 20, 1887 |
| 2,688,648 | McIlvaine | Sept. 7, 1954 |
| 2,921,216 | Chubb | Jan. 12, 1960 |
| 2,921,217 | Chubb | Jan. 12, 1960 |